No. 797,001. PATENTED AUG. 15, 1905.
F. H. HEITGER.
SPEED CHANGING GEAR.
APPLICATION FILED APR. 14, 1905.

2 SHEETS—SHEET 1.

Witnesses
Frank A. Fahle
J. A. Walsh

Inventor
Frank H. Heitger
By
Bradford & Hood
Attorneys

No. 797,001. PATENTED AUG. 15, 1905.
F. H. HEITGER.
SPEED CHANGING GEAR.
APPLICATION FILED APR. 14, 1905.

2 SHEETS—SHEET 2.

Witnesses
Frank B. A. Fahle
J. A. Walsh

Inventor
Frank H. Heitger
By
Bradford S. Hood
Attorney

UNITED STATES PATENT OFFICE.

FRANK H. HEITGER, OF INDIANAPOLIS, INDIANA, ASSIGNOR TO SPEED CHANGING PULLEY COMPANY, OF INDIANAPOLIS, INDIANA, A CORPORATION OF INDIANA.

SPEED-CHANGING GEAR.

No. 797,001.        Specification of Letters Patent.        Patented Aug. 15, 1905.

Application filed April 14, 1905. Serial No. 255,587.

*To all whom it may concern:*

Be it known that I, FRANK H. HEITGER, a citizen of the United States, residing at Indianapolis, in the county of Marion and State of Indiana, have invented certain new and useful Improvements in Speed-Changing Gear, of which the following is a specification.

The object of my invention is to produce a speed-changing and reversing gear in which the several intermeshing gears will at all times be in mesh.

The accompanying drawings illustrate my invention.

Figure 1:
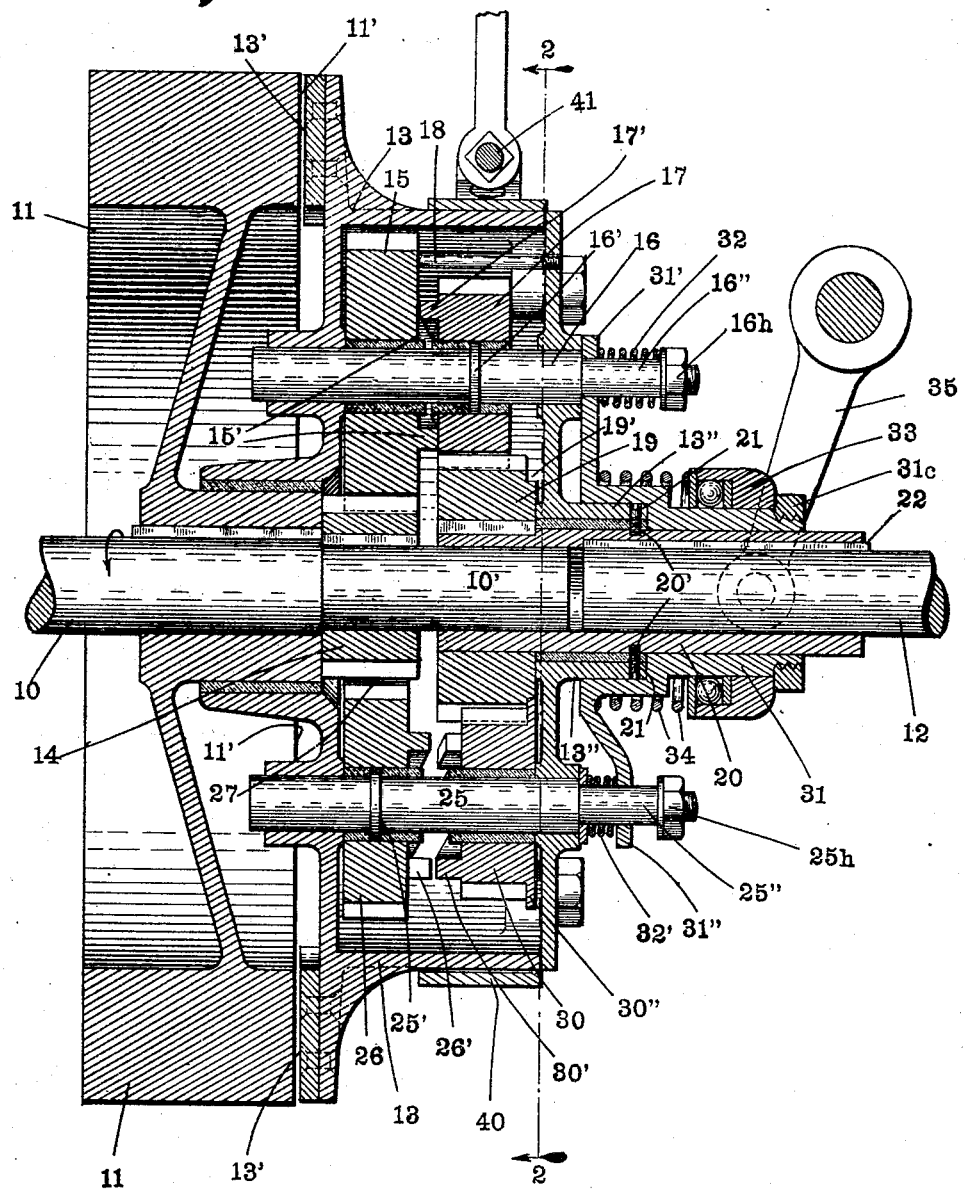
Figure 2:
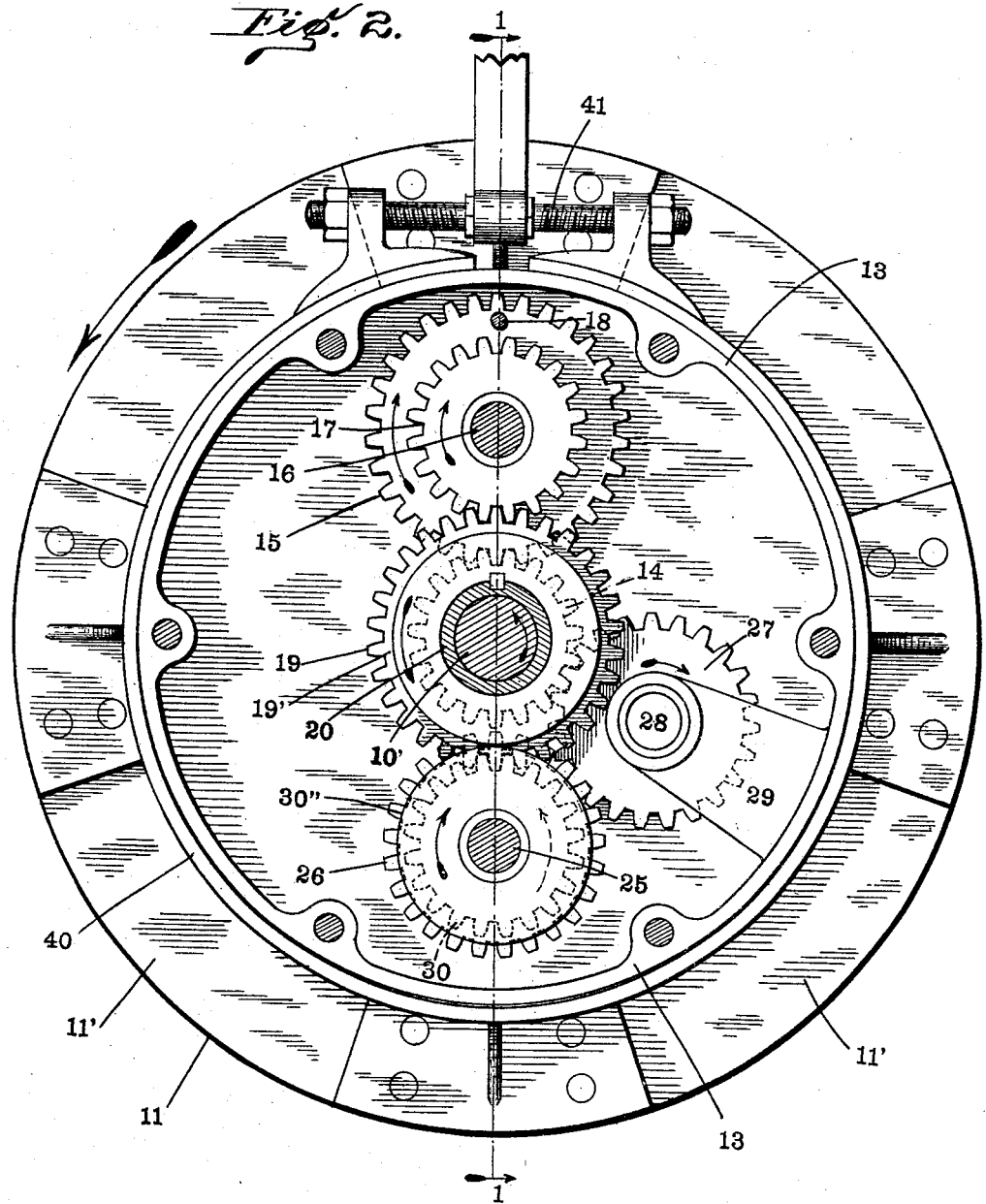

Figure 1 is a central vertical section on line 1 1 of Fig. 2, and Fig. 2 a transverse section on line 2 2 of Fig. 1.

In the drawings, 10 indicates the main driveshaft, carrying a suitable fly-wheel 11, having a friction-face 11'. Arranged in alinement with the shaft 10 is the driven shaft 12. Flywheel 11 is keyed upon shaft 10, and sleeved upon its hub is a gear-casing 13, which is provided with a friction-face 13', adapted to engage the friction-face 11' of the wheel 11. The inner end of shaft 10 is ensmalled at 10', and keyed thereon immediately adjacent the inner end of the hub of wheel 11 is gear 14. Meshing with gear 14 is a gear 15, which is loosely mounted upon a pin 16, which is mounted in the casing 13 parallel with the shaft 10 and capable of axial movement through the casing. Gear 15 is provided on one face with a clutch member 15', which is adapted to be engaged by a clutch member 17', formed upon the adjacent face of a gear 17, which is also journaled on the pin 16. Gear 17 is caused to move axially with pin 16 by means of a collar 16'. Gear 15 is prevented from axial movement in the casing 13 by any suitable means—such, for instance, as a pin or stop 18, carried by the casing 13 and adapted to engage one face of the gear 15. Gear 17 meshes at all times with a gear 19, which is keyed upon a shell 20, which shell is journaled upon the inner end of the portion 10' of shaft 10 and is journaled within the hub 13'' of the casing 13. Sleeve 20 is axially fixed relative to the casing 13 by means of pins 21, which project into a peripheral groove 20', formed in the periphery of sleeve 20. Said sleeve is splined upon the inner end of the driven shaft 12 by a suitable spline 22.

Arranged in casing 13, preferably diametrically opposite the pin 16, is a similar pin 25, which is axially movable in its bearings in the casing 13. Journaled upon pin 25 and axially fixed thereon by means of collar 25' is a gear 26, which meshes with an intermediate gear 27, journaled on a pin 28, mounted in suitable bearings 29, carried by the casing 13, and this intermediate gear 27 meshes with gear 14. Gear 26 carries on one face a clutch member 26', which is adapted to be engaged by the clutch member 30', carried on the adjacent face of a gear 30, which is journaled on the pin 25 and meshes with gear 19. In order to prevent axial movement of the gear 30, it is provided at the end opposite the clutch member 30' with a flange 30'', which rolls into a peripheral notch 19', formed in the adjacent portion of gear 19.

Sleeved upon hub 13'' and sleeve 20 is a shifting member 31, which is provided with a pair of arms 31' and 31'', arm 31' being perforated and sleeved over the ensmalled outer end 16'' of pin 16 and arm 31 being similarly perforated and slipped over the ensmalled end 25'' of the pin 25. Pin 16 is provided on its outer end with a head $16^h$, and arranged between this head and the arm 31' is a spring 32. Pin 25 is similarly provided at its outer end with a head $25^h$, adapted to be engaged by the arm 31'', and arranged between the arm 31'' and the shoulder at the inner end of the ensmalled portion 25'' is a spring 32'. Sleeved upon the shifting member 31 is a yoke-head 33, which is held thereon in one direction by a collar $31^c$. Interposed between the yoke-head 33 and the arms of the shifting member 31 is a spring 34. Yoke-head 33 may be shifted by a shifting-lever 35 in the usual manner.

The exterior of the casing 13 is adapted to be engaged in the usual manner by means of a stationary friction-strap 40, which may be tightened or loosened on the casing 13 by any suitable means 41.

With the parts in the position shown in the drawings if shaft 10 be rotated in the direction indicated by the arrow the gear 14 will rotate gear 15 in the direction indicated by the arrow, and this through clutch members 15' and 17' will rotate gear 17 in the same direction. If the brake member 40 be loose on the casing 13, the entire casing will be rotated and there will be no movement of shaft 12. If the brake member be tightened about the casing 13, gear 17 will operate to drive gear 19 in the same direction as shaft 10, and thus through sleeve 20 will drive shaft 12 in the same direction, at a slower speed than said shaft, however, on account of the reduction caused by the ratio between gears 14, 15, 17, and 19. The speed of the shaft 12 in this direction may be decreased by loosening the brake member 40 more or less, so as to permit more or less slipping of the casing 13. If a speed nearer to the speed of shaft 10 is desired, the operator will move lever 35 to the left so as to shift casing 13 axially, and thus bring the two friction-faces 13' and 11' together, the brake member 40 being released during this movement, whereupon the whole structure becomes locked together and shaft 12 rotates in the same direction as shaft 10. The speed of the shaft 12 may be diminished by releasing more or less the pressure exerted upon the casing 13 by the spring 34. In order to obtain a reverse movement of the shaft 12, the operator throws lever 35 to the right, whereupon yoke member 31 is shifted to the right. The first action is to pull pin 16 to the right, so as to withdraw clutch member 17' from engagement with clutch member 15', the spring 32 being sufficient for this purpose. During this time spring 32' is expanding until arm 31'' engages head 25$^h$. Further movement of the yoke-head 31 to the right serves to pull clutch member 26' into engagement with clutch member 30', whereupon rotation of shaft 10 in the direction indicated by the arrow causes a rotation of gear 30 in the same direction by reason of the intermediate gear 27, and therefore causes a reverse rotation of gear 19 and shaft 12, it being understood, of course, that for this purpose it is necessary to clamp the brake 40 on the casing 13.

The springs 32 and 32' may be omitted, if desired, and the arms 31' and 31'' positively connected to the pins 16 and 25; but in this case a greater space must be left between the adjacent ends of the clutch members in order to permit the consequent greater movement of the two gears 17 and 26.

I claim as my invention—

1. In a speed-changing gear, the combination with a driving-gear and a driven gear, of a pair of planetary gears one continuously meshing with the driving-gear and the other continuously meshing with the driven gear, a clutch forming a separable connection between said last-mentioned gears, means for axially shifting said clutch, and means for preventing the planetary movement of said gears.

2. In a speed-changing gear, the combination, with the driving-shaft and a driving element carried thereby, a driving-gear carried by said shaft, a driven gear arranged in alinement therewith, a casing coaxial with said parts, a driven element carried by said casing and adapted to engage with the said driving element, means for bringing said driving and driven elements into and out of coöperative relation, means for controlling the rotative movement of said casing, and intermediate planetary gearing between the driving-gear and the driven gear.

3. In a speed-changing gear, the combination, with the driving-shaft and a frictional driving element carried thereby, a driving-gear carried by said shaft, a driven gear arranged in alinement therewith, a casing coaxial with said parts and axially movable, a friction element carried by said casing and adapted to engage with the frictional driving element, means for shifting said casing, to bring said frictional elements into and out of coöperative relation, means for controlling the rotative movement of said casing, and intermediate planetary gearing between the driving-gear and the driven gear.

4. In a speed-changing gear, the combination, with the driving-shaft and a driving element carried thereby, a driving-gear carried by said shaft, a driven gear arranged in alinement therewith, a casing coaxial with said parts and axially movable, a driven element carried by said casing and adapted to engage with the said driving element, means for bringing said driving and driven elements into and out of coöperative relation, means for controlling the rotative movement of said casing, and intermediate planetary gearing between the driving-gear and the driven gear.

5. In a speed-changing gear, the combination, with the driving-shaft and a frictional driving element carried thereby, a driving-gear carried by said shaft, a driven gear arranged in alinement therewith, a casing coaxial with said parts and axially movable, a frictional element carried by said casing and adapted to engage with the frictional driving element, means for bringing said frictional elements into and out of coöperative relation, means for controlling the rotative movement of said casing, and intermediate planetary gearing between the driving-gear and the driven gear.

6. In a speed-changing gear, the combination, with the driving-shaft and a driving element carried thereby, a driving-gear carried by said shaft, a driven gear carried in alinement therewith, a casing coaxial with said parts, a driven element carried by said casing and adapted to engage with the said driving element, means for shifting said casing to bring said driving and driven elements into and out of coöperative relation, means for controlling the rotative movement of said casing, a pair of planetary gears journaled in said casing and one meshing with the driving-gear, interengaging clutch members carried by said two planetary gears, and means for shifting one gear axially with relation to the other, for the purpose set forth.

7. In a speed-changing gear, the combination, with the driving-shaft and a frictional driving element carried thereby, a driving-gear carried by said shaft, a driven gear arranged in alinement therewith, a casing coaxial with said parts and axially movable, a friction element carried by said casing and adapted to engage with the frictional driving element, means for shifting said casing, means for bringing said frictional elements into and out of coöperative relation, means for controlling the rotative movement of said casing, a pair of planetary gears journaled in said casing and one meshing with the driving-gear and the other with the driven gear, interengaging clutch members carried by said two planetary gears, and means for shifting one gear axially with relation to the other, for the purpose set forth.

8. In a speed-changing gear, the combination, with the driving-shaft and a driving element carried thereby, a driving-gear carried by said shaft, a driven gear arranged in alinement therewith, a casing coaxial with said parts and axially movable, a driven element carried by said casing and adapted to engage with the said driving element, means for bringing said driving and driven elements into and out of coöperative relation, means for controlling the rotative movement of said casing, a pair of planetary gears journaled in said casing and one meshing with the driving-gear and the other with the driven gear, interengaging clutch members carried by said two planetary gears, and means for shifting one gear axially with relation to the other, for the purpose set forth.

9. In a speed-changing gear, the combination, with the driving-shaft and a frictional driving element carried thereby, a driving-gear carried by said shaft, a driven gear arranged in alinement therewith, a casing coaxial with said parts and axially movable, a frictional element carried by said casing and adapted to engage with the frictional driving element, means for bringing said frictional elements into and out of coöperative relation, means for controlling the rotative movement of said casing, a pair of planetary gears journaled in said casing and one meshing with the driving-gear and the other with the driven gear, interengaging clutch members carried by said two planetary gears, and means for shifting one gear axially with relation to the other, for the purpose set forth.

10. In a speed changing and reversing gear, the combination, with the driving-shaft and a frictional driving element carried thereby, a driving-gear carried by said shaft, a driven gear arranged in alinement therewith, a gear-casing coaxial with said parts, a frictional element carried thereby adapted to coöperate with the frictional driving element, means for shifting said casing axially, means for controlling the rotative movement of said casing, a pair of planetary gears journaled in said casing, one meshing with the driving-gear and the other with the driven gear, interengaging clutch members carried by said two planetary gears, means for shifting one of said gears axially with relation to the other, a second pair of planetary gears, interengaging clutch members between said second pair of planetary gears, means for moving one of said second pair of gears axially relative to the other, and an intermediate gear meshing with one of said gears, the said train of gears consisting of the second pair of planetary gears and the intermediate gear forming a connection between the driving and driven gear.

In witness whereof I have hereunto set my hand and seal, at Indianapolis, Indiana, this 4th day of April, A. D. 1905.

FRANK H. HEITGER. [L. S.]

Witnesses:
ARTHUR M. HOOD,
JAMES A. WALSH.